US010737187B2

(12) United States Patent
Kamata et al.

(10) Patent No.: US 10,737,187 B2
(45) Date of Patent: Aug. 11, 2020

(54) CODING TOY, BLOCK, STAGE, FIGURE BODY TOY AND CODING METHOD

(71) Applicant: SEGA TOYS CO., LTD., Tokyo (JP)

(72) Inventors: Akemi Kamata, Tokyo (JP); Yuki Ito, Tokyo (JP)

(73) Assignee: SEGA TOYS CO., LTD., Tokyo (JP)

( * ) Notice: Subject to any disclaimer, the term of this patent is extended or adjusted under 35 U.S.C. 154(b) by 92 days.

(21) Appl. No.: 16/024,693

(22) Filed: Jun. 29, 2018

(65) Prior Publication Data

US 2019/0022539 A1 Jan. 24, 2019

Related U.S. Application Data

(63) Continuation of application No. PCT/JP2016/082731, filed on Nov. 4, 2016.

(30) Foreign Application Priority Data

Jan. 5, 2016 (JP) .................................. 2016-000503

(51) Int. Cl.
*A63H 5/00* (2006.01)
*G09B 1/16* (2006.01)
(Continued)

(52) U.S. Cl.
CPC .................. *A63H 5/00* (2013.01); *A63H 3/28* (2013.01); *A63H 13/00* (2013.01); *A63H 30/02* (2013.01);
(Continued)

(58) Field of Classification Search
CPC . A63H 5/00; A63H 3/28; A63H 13/00; A63H 30/02; A63H 30/04; A63H 33/00; G09B 1/16; G09B 19/0053
(Continued)

(56) References Cited

U.S. PATENT DOCUMENTS

2004/0229696 A1* 11/2004 Beck ........................ A63H 3/28
463/40
2014/0213140 A1* 7/2014 Goh ........................ A63H 3/28
446/175

FOREIGN PATENT DOCUMENTS

JP 3062172 U 9/1995
JP 09-114355 A 5/1997
(Continued)

OTHER PUBLICATIONS

International Preliminary Report on Patentability and Written Opinion of the International Searching Authority in International Application No. PCT/JP2016/082731 dated Jul. 10, 2018.
(Continued)

*Primary Examiner* — John E Simms, Jr.
*Assistant Examiner* — Rayshun K Peng
(74) *Attorney, Agent, or Firm* — The Marbury Law Group, PLLC

(57) ABSTRACT

A coding toy includes a control object (a figure body) having a control unit, an input unit and an output unit, and a part (an icon block) having a code identifier (an icon) that corresponds to a control detail of the control object. The control unit of the control object obtains code identifier information and positional information from the code identifier indicated by the part disposed in a predetermined position and the position of the part and controls the output unit to a control detail and in a control sequence that are determined by the code identifier information and the positional information.

13 Claims, 13 Drawing Sheets

Figure 1:
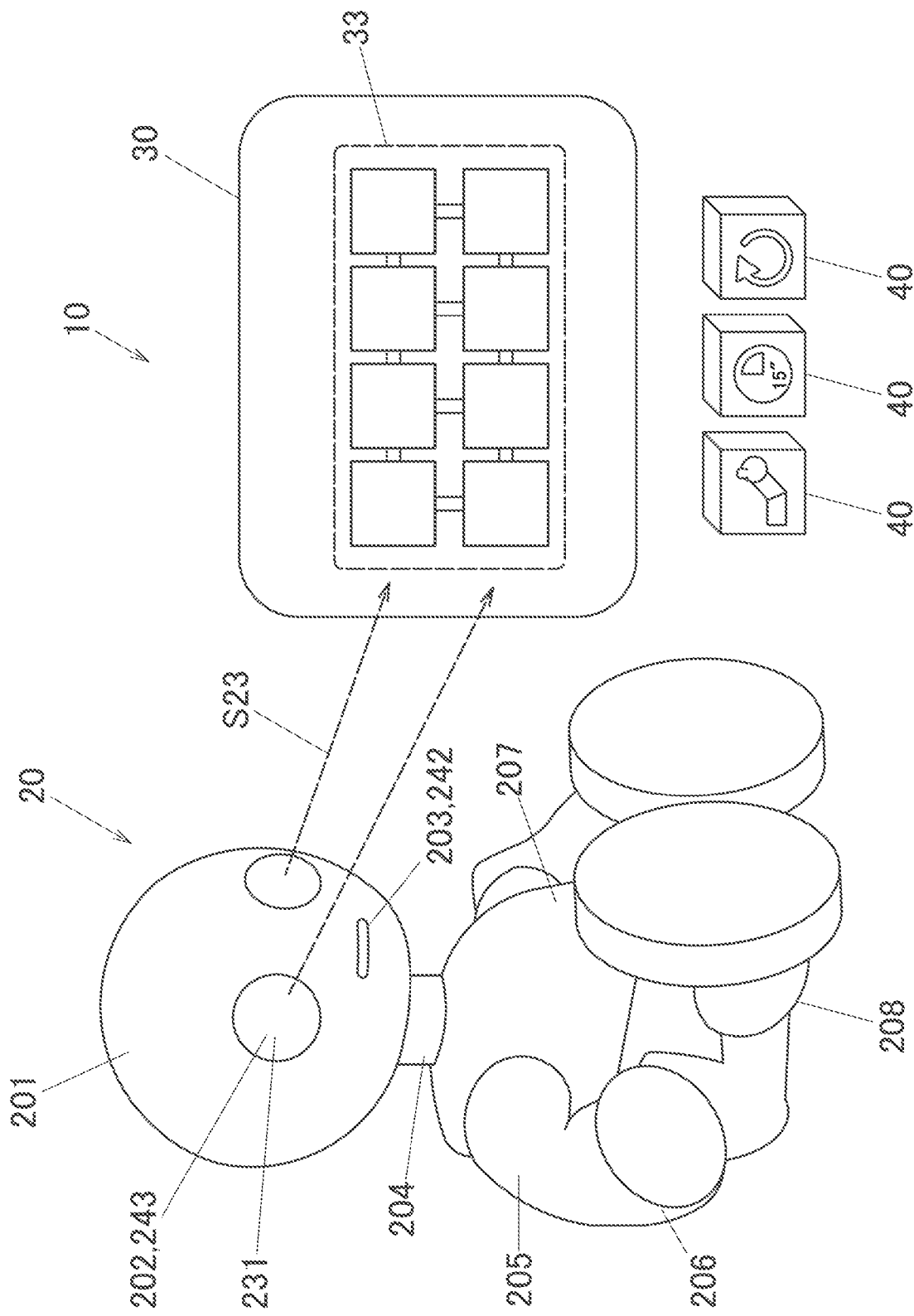

(51) Int. Cl.
*A63H 30/04* (2006.01)
*G09B 19/00* (2006.01)
*A63H 13/00* (2006.01)
*A63H 3/28* (2006.01)
*A63H 30/02* (2006.01)
*A63H 33/00* (2006.01)

(52) U.S. Cl.
CPC .............. *A63H 30/04* (2013.01); *A63H 33/00* (2013.01); *G09B 1/16* (2013.01); *G09B 19/0053* (2013.01)

(58) Field of Classification Search
USPC ........................................................ 446/484
See application file for complete search history.

(56) References Cited

FOREIGN PATENT DOCUMENTS

| | | |
|---|---|---|
| JP | 2002-140070 A | 5/2002 |
| JP | 2011-523909 A | 8/2011 |

OTHER PUBLICATIONS

Niino, "Easy development environment "programmin" which can also perform game programming, Ministry of Education, Culture, Sports, Science and Technology (MEXT)", http://www.publickey1.jp/blog/10/post_118.html, non-official translation, (Aug. 19, 2010).

Sakamoto, "Programeens: A Fun Website from MEXT that Teaches Programming through Games", http://weekly.ascii.jp/elem/000/000/023/237, Kadokawa Corp., Weekly ASCII Web, non-official translation (Jan. 4, 2017).

Ministry of Education, Culture, Sports, Science and Technology of Japan, "PROGRAMIN", [online], Internet <URL: http://www.mext.go.jp/programin>), retrieved Oct. 19, 2015.

Nakamura, et al., "PEN: The Programming Environment for Novice Education", vol. 2002, No. 104, pp. 65-71, IPSJ SIG Notes, Information Processing Society of Japan, (Oct. 22, 2005).

Notification of the First Office Action received from the China National Intellectual Property Administration in related counterpart Chinese Patent Application No. 201680077495.5 dated Feb. 3, 2020.

* cited by examiner

FIG.4

| ICONS | CONTROL DETAILS |
|---|---|
| | RAISE ARM (RIGHT) OBLIQUELY UPWARDS |
| | REPEAT RAISING AND UNBENDING ARM (RIGHT) |
| ... | ... |
| 15" | CONTINUE THE SAME ACTION FOR 15 SECONDS |
| 30" | CONTINUE THE SAME ACTION FOR 30 SECONDS |
| ... | ... |
| | RETURN TO ORIGIN |
| ... | ... |

FIG.5

| ICON CLASS | CLASSIFICATION |
|---|---|
| HEAD | LOWERED AND RAISED |
| NECK | TWISTED TO RIGHT, TWISTED TO LEFT |
| EYE | SHINE, STOP SHINING |
| ARM(RIGHT) | RAISED, LOWERED, RAISED OBLIQUELY UPWARDS, LOWERED OBLIQUELY DOWNWARDS |
| ARM(LEFT) | RAISED, LOWERED, RAISED OBLIQUELY UPWARDS, LOWERED OBLIQUELY DOWNWARDS |
| ELBOW(RIGHT) | BENT, UNBENT |
| ELBOW(LEFT) | BENT, UNBENT |
| LEG(RIGHT) | RAISED, LOWERED |
| LEG(LEFT) | RAISED, LOWERED |
| EMOTICON | GOOD MORNING, GOOD NIGHT, FINE?, SURPRISED, DELIGHTED, SAD, SLEEPY, MONOTONOUS, INTERESTING, ANGRY, CRYING, GOOD!, HUNGRY, FULL, TROUBLED, GOOD-BYE, HELLO, LONELY, TIRED, HELP!, OK!, NO!, HAVE A REST, DISAPPOINTED, COLD, HOT, FRIENDLY, LOVE(LIKE), DISLIKE, THANK YOU, SORRY, STUDY, LOOKING FORWARD TO ♪, CONGRATULATION, TAKE A SHORT REST, AFTER-CLASS ACTIVITIES IN SCHOOL, DEPRESSED, GOODY!, REGRETTABLE, LATE, FRIGHTENED |
| OTHER EMOJIS | WEATHER, ANIMAL, ITEM, SPORTS, SCHOOL, OUTING, PLANT, FOOD, FRIEND, FAMILY, LIFE, PLAY, OTHERS |
| DIALOG | SENTENCE1, SENTENCE2, … |
| RUNNING BODY | ADVANCE, REVERSE, TURN TO RIGHT, TURN TO LEFT |

FIG.6

| ICON CLASS | CLASSIFICATION |
|---|---|
| MEMORY | |
| TIME | 0 SECOND, 5 SECONDS, 10 SECONDS, 15 SECONDS, 20 SECONDS, 30 SECONDS, 40 SECONDS, 50 SECONDS, 1 MINUTE, 2 MINUTES, 3 MINUTES, ... |
| START/END | |
| NUMBER OF TIMES | ONE TIME, TWO TIMES, THREE TIMES, FOUR TIMES, FIVE TIMES, ... |
| BGM | BGM①, BGM②, BGM③, BGM④, BGM⑤, BGM⑥, BGM⑦, BGM⑧, BGM⑨, BGM⑩, ... |
| SE | SE①, SE②, SE③, SE④, SE⑤, SE⑥, SE⑦, SE⑧, SE⑨, SE⑩, ... |
| STOP/GO | |
| WAIT | |
| RETURN TO ORIGIN | |
| ANGLE | 0 DEGREE, 45 DEGREES, 90 DEGREES |
| NUMERIC FIGURE | 0, 1, 2, 3, 4, 5, 6, 7, 8, 9, 10 |
| HIRAGANA | あ、い、う、…、わ、を、ん |
| ALPHABET | A, B, C, ..., X, Y, Z, a, b, c, ..., x, y, z |
| SIGN | +, -, =, ×, ÷, →, ←, ↑, ↓, !, ?, !, ♡, ☆, ... |
| OTHERS | ※ |

228    229

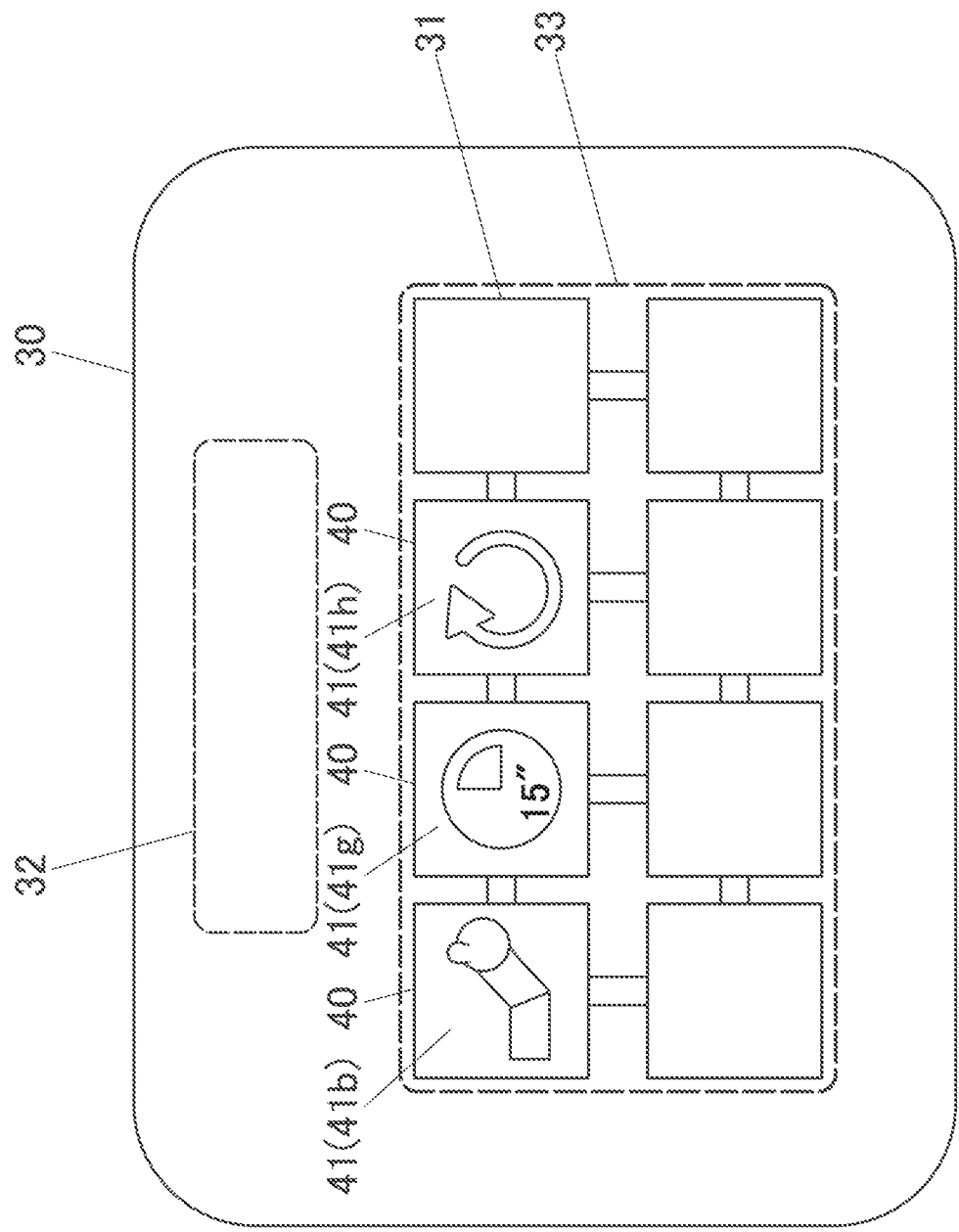

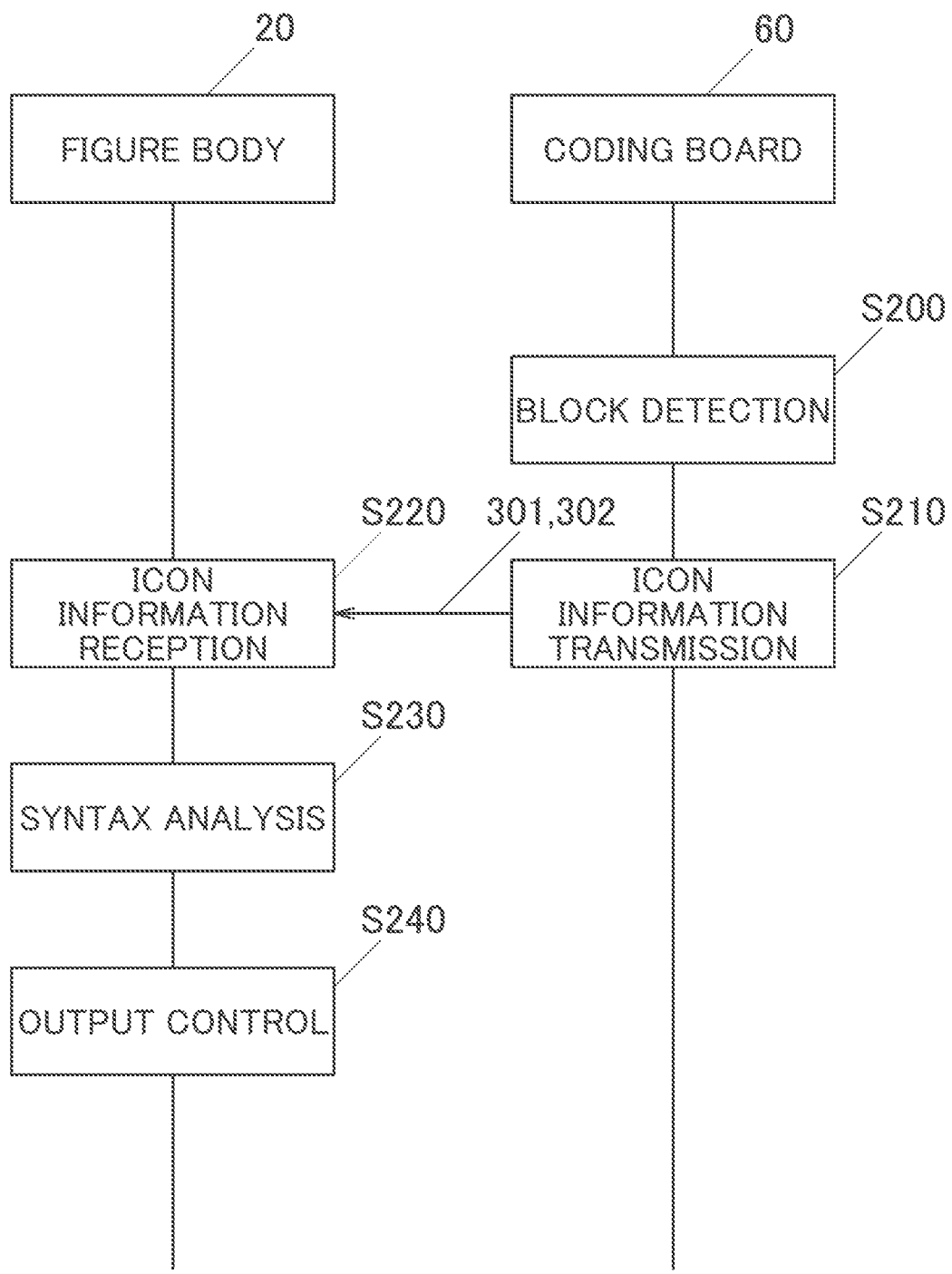

CODING TOY, BLOCK, STAGE, FIGURE BODY TOY AND CODING METHOD

CROSS-REFERENCE TO RELATED APPLICATION

This application is based upon and claims the benefit of priority under 35 USC 119 of the prior PCT Application No. PCT/JP2016/082731 filed on Nov. 4, 2016, the entire disclosure of which, including the description, claims, drawings and abstract, is incorporated herein by reference.

BACKGROUND OF THE INVENTION

Field of the Invention

The present invention relates to a coding toy, a bloc, a stage and a figure body toy for the coding toy, and a coding method.

Description of the Related Art

Conventionally, various intellectual training toys and teaching/learning toys have been proposed for kids. These teaching or learning materials are provided in various forms according to teaching or learning objects. For example, as a coding teaching material, Non-Patent Document 1 ("PROGRAMIN", by Ministry of Education, Culture, Sports, Science and Technology of Japan, [online], [retrieved on Oct. 19, 2015], Internet <URL: http://www.mext.go.jp/programin>) discloses a web teaching material that is intended to teach kids the joy of creation and how to create. In this web teaching material, a user can draw a picture that is a target or object to be controlled. Then, when the user piles up icons having different roles on the picture that he or she wants to move in a sequence in which the user wants to move the picture, the picture can move in that sequence. Consequently, in learning programming, properly speaking, a learner needs to understand a complex grammar of a programming language. However, with the web teaching material disclosed in Non-patent Document 1, the leaner can skip over the relevant leaning step and learn a theory of coding (programming) without any difficulty.

In the web teaching material disclosed in Non-Patent Document 1, however, since the contents to be controlled are designed through operations on a display screen, a place where to perform coding is limited. Further, objects to be controlled are limited to actions of a picture that is drawn within the screen. Consequently, the degree of freedom in selection of places where to design and objects to be controlled is small.

SUMMARY OF THE INVENTION

An object of the invention is to provide a coding toy that can execute coding of a high degree of freedom using a simple method, a block, a stage and a figure body toy for the coding toy, and a coding method.

According to a first aspect of the invention, there is provided a coding toy including a control object having a control unit, an input unit and an output unit and a part having a code identifier corresponding to a control detail of the control object, wherein the control unit obtains code identifier information and positional information from the code identifier indicated by the part that is disposed in a predetermined position and the position of the part through the input unit and controls the output unit to a control detail and in a control sequence that are determined by the code identifier information and the positional information.

According to another aspect of the invention, there is provided a block having a code identifier corresponding to a control detail of a control object and configured to cause the control object to obtain code identifier information and positional information based on the code identifier indicated by the block disposed in a predetermined position and the position of the block and allow the control object to be controlled to a control detail and in a control sequence that are determined by the code identifier information and the positional information.

According to a further aspect of the invention, there is provided a figure body toy having a control unit, an input unit and an output unit, wherein the control unit obtains code identifier information and positional information from a code identifier corresponding to a control detail of a control object indicated by a part disposed in a predetermined position and the position of the part through the input unit and controls the output unit to a control detail and in a control sequence that are determined by the code identifier information and the positional information.

According to an aspect of the invention, there is provided a stage configured to allow a part having a code identifier corresponding to a control detail of a control object to be disposed in a predetermined position, cause the control object to obtain code identifier information and positional information from the code identifier information indicated by the part disposed in the predetermined position and the position of the part, and allow the control object to be controlled to a control detail and in a control sequence that are determined by the code identifier information and the positional information.

According to another aspect of the invention, there is provided a coding method for a coding toy that includes a control object and a part having a code identifier corresponding to a control detail of the control object, including causing the control object to obtain code identifier information and positional information from the code identifier indicated by the part that is disposed in a predetermined position and the position of the part and allowing the control object to be controlled to a control detail and in a control sequence that are determined by the code identifier information and the positional information.

According to the invention, the control object obtains the code identifier information and the positional information from the code identifier shown by the part that is disposed in the predetermined position and the position of the part and is controlled to the control detail and in the control sequence that are determined by the code identifier information and the positional information. Consequently, since the coding work of the program can be executed by disposing the part, it is possible to provide the coding toy that can execute the coding of the high degree of freedom using the simple method, the block, the stage and the figure body toy for the coding toy, and the coding method.

BRIEF DESCRIPTION OF THE SEVERAL VIEWS OF DRAWINGS

Figure 2:
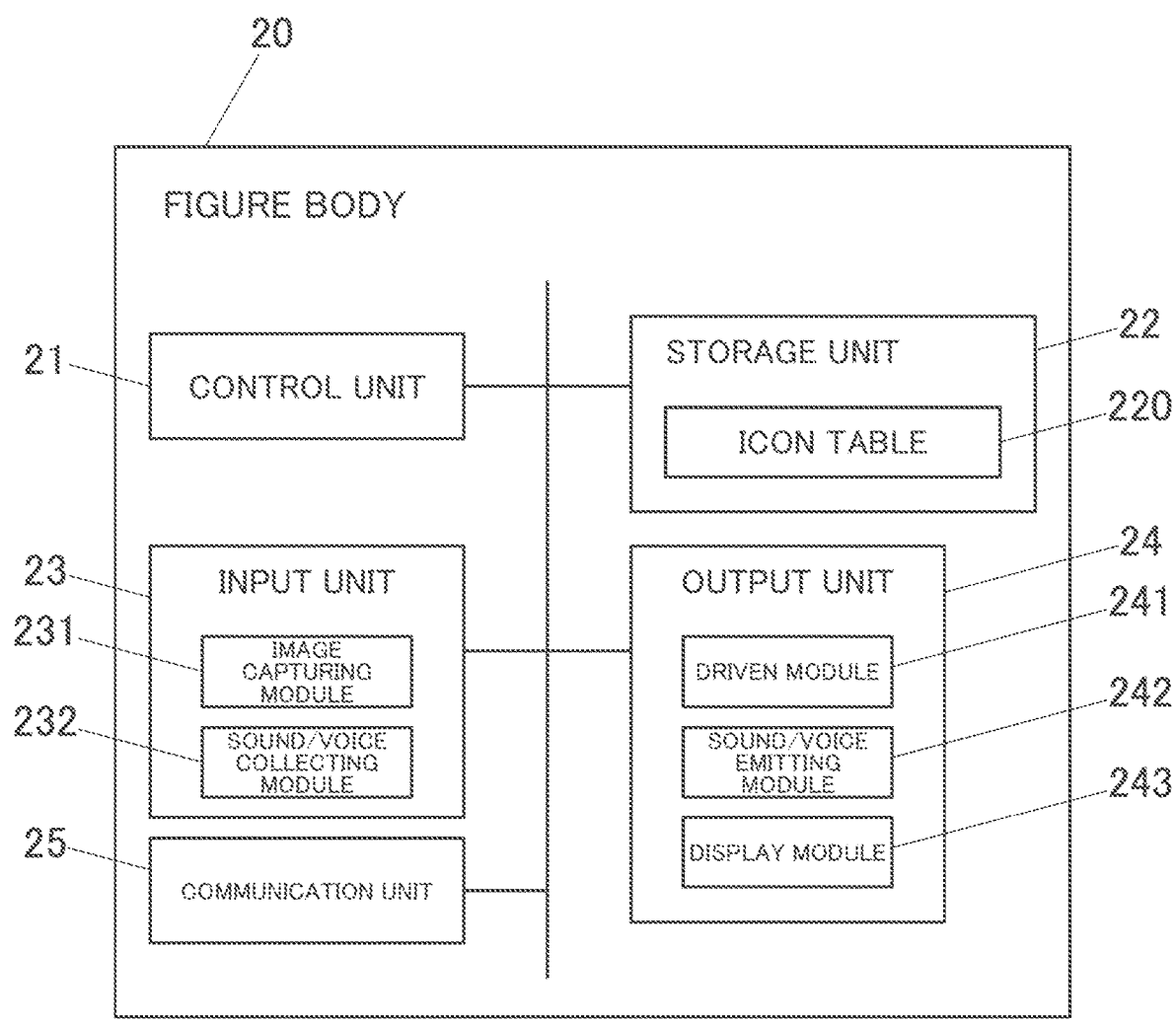
Figure 3A:
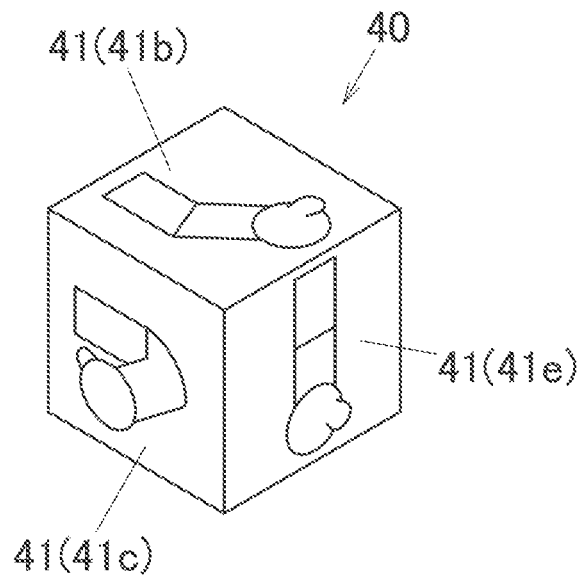
Figure 3B:
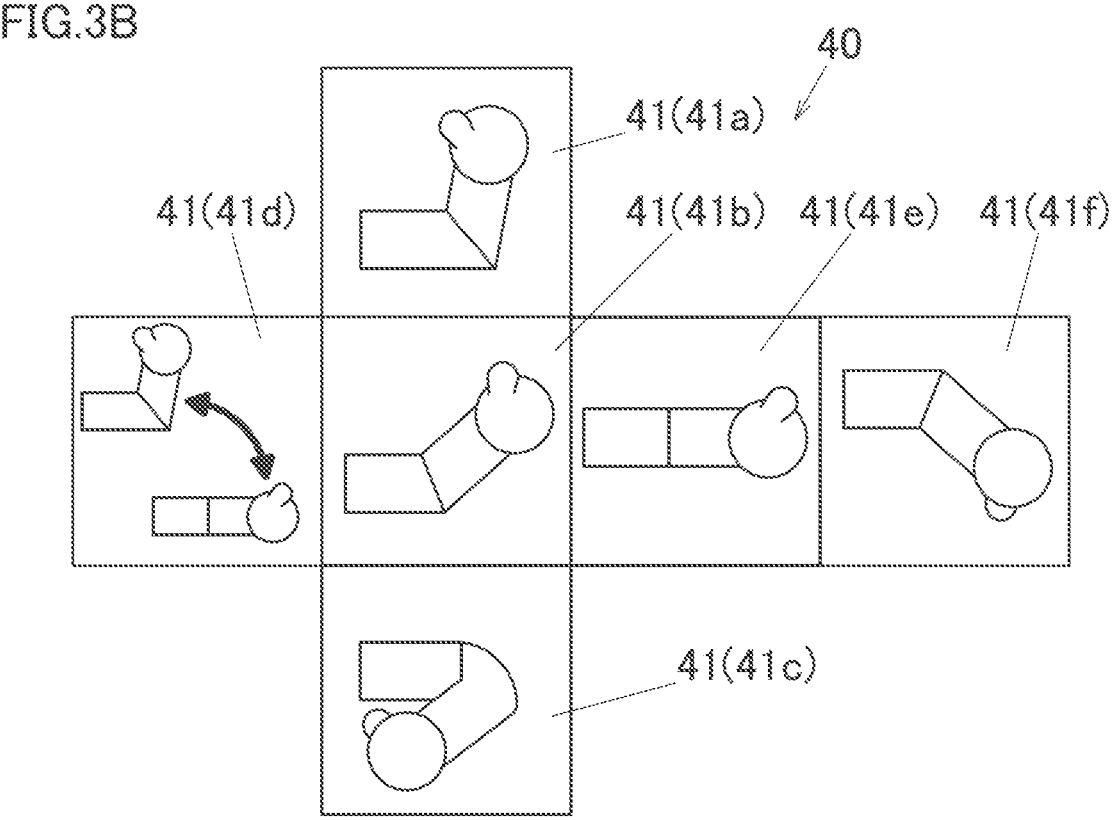
Figure 8:
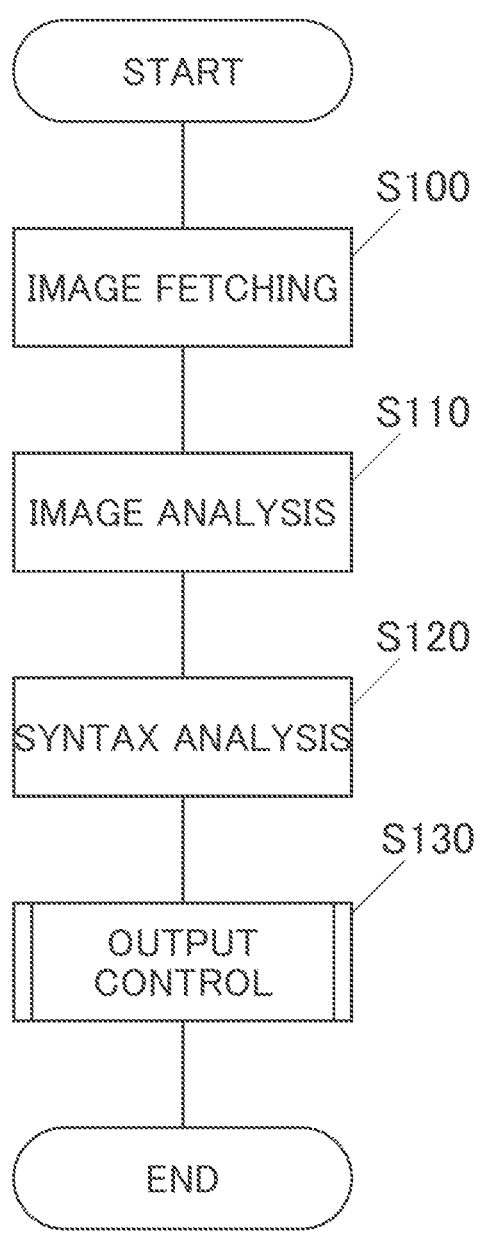
Figure 9:
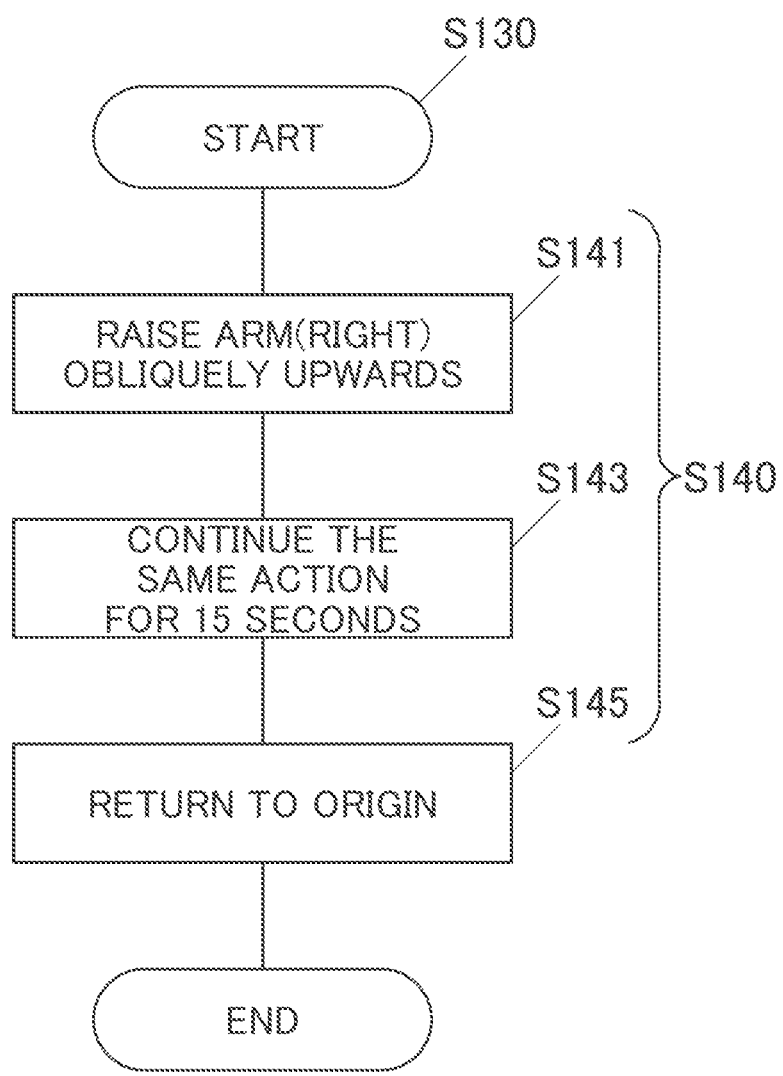
Figure 10A:
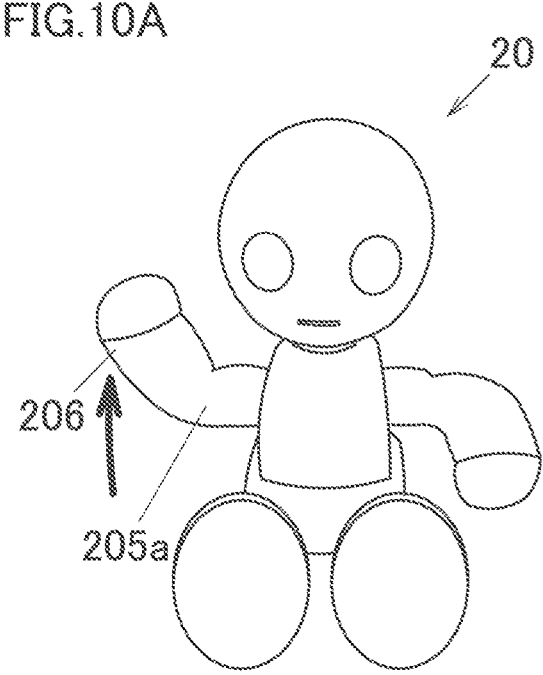
Figure 10B:
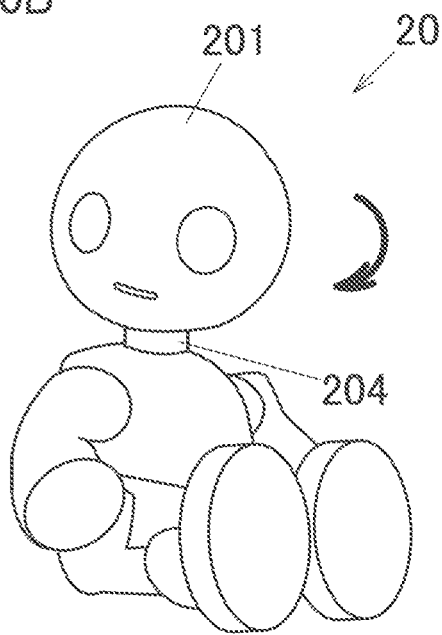
Figure 10C:
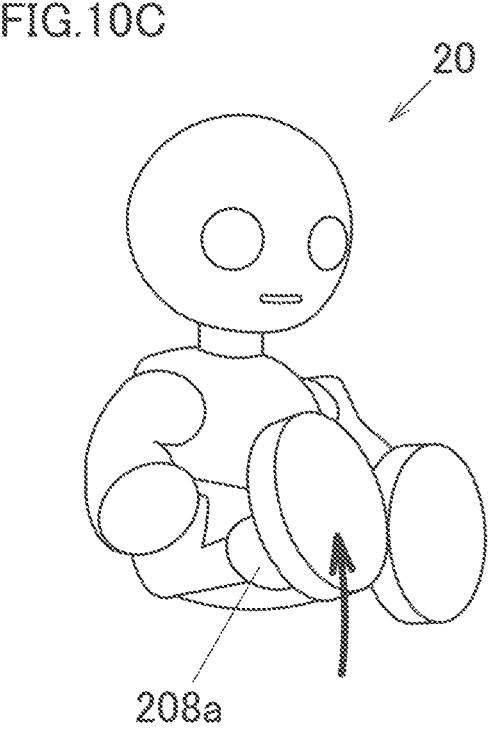
Figure 10D:
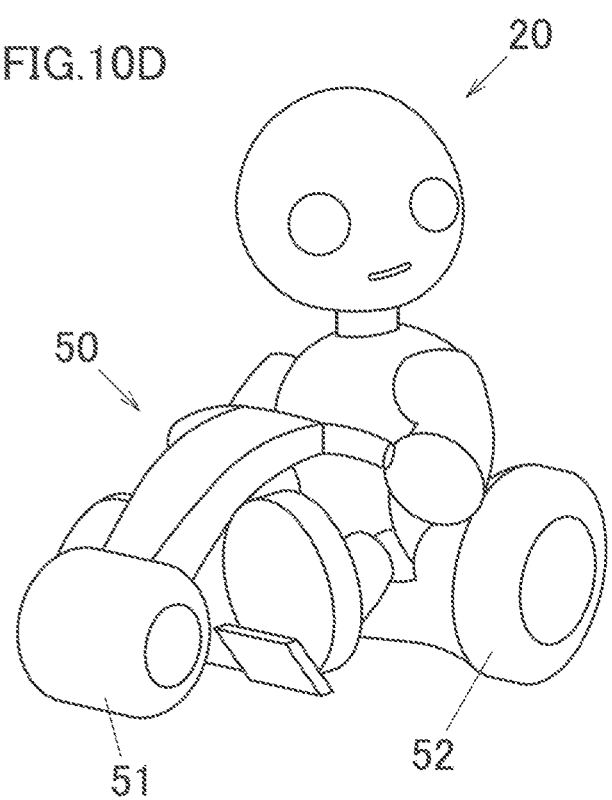
Figure 11:
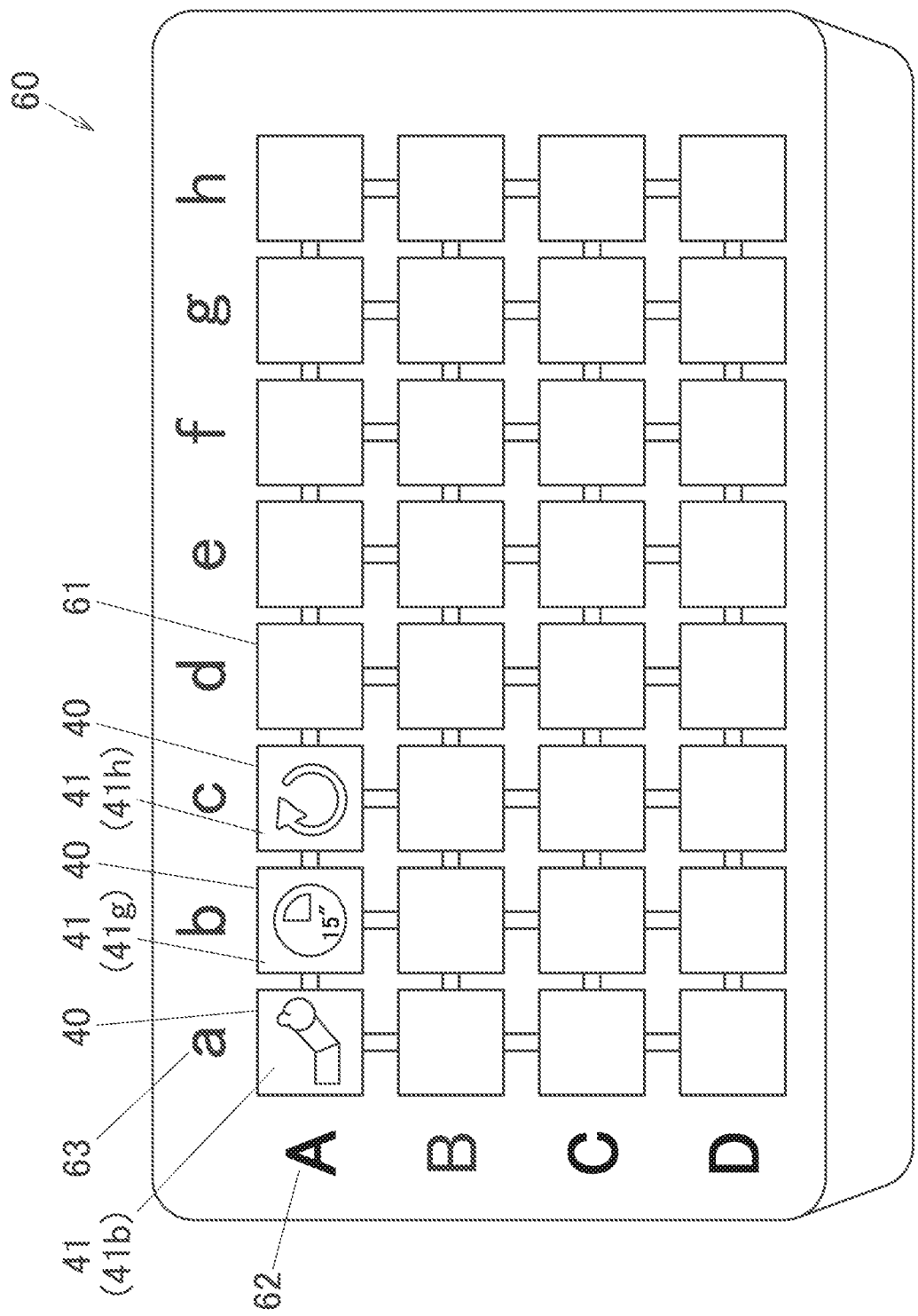
Figure 12:
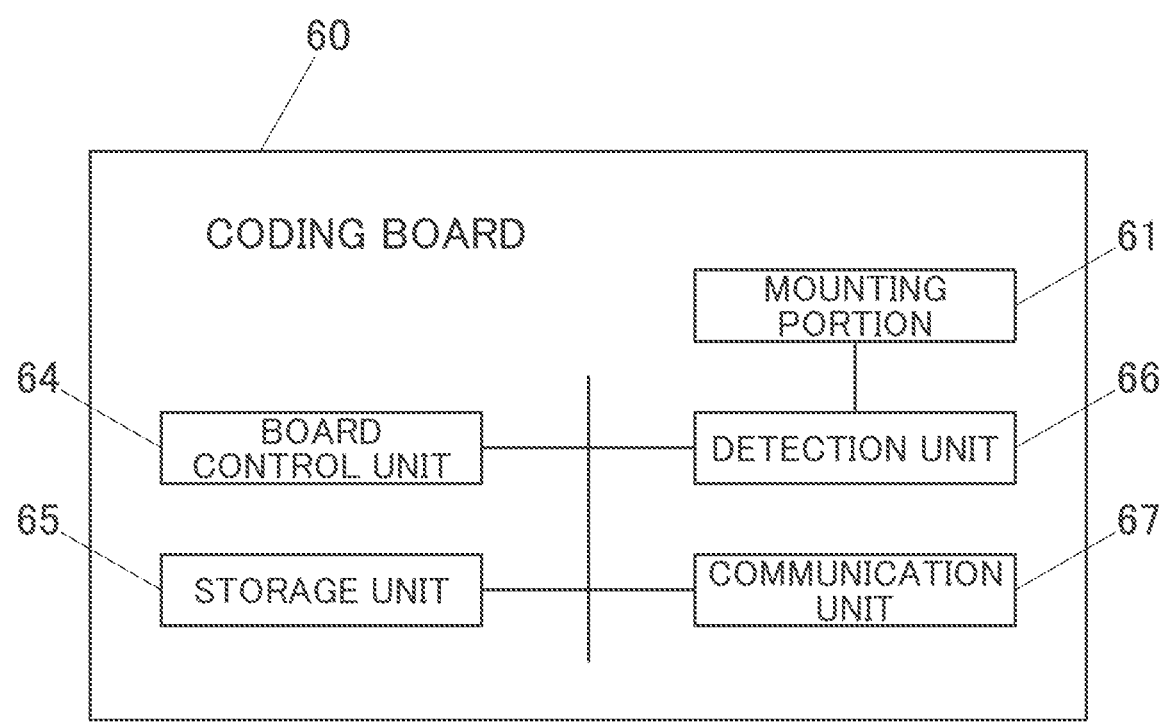

FIG. 1 is a drawing showing the configuration of a coding toy according to a first embodiment of the invention, FIG. 2 is a drawing the configuration of a figure body toy according to the first embodiment of the invention, FIG. 3A is a perspective view showing the configuration of an icon block according to the first embodiment of the invention, FIG. 3B is a development showing the configuration of the icon block according to the first embodiment of the invention, FIG. 4 is a drawing showing the configuration of an icon table according to the first embodiment of the invention, FIG. 5 is a drawing showing an example of types of icons according to the first embodiment of the invention, FIG. 6 is a drawing showing an example of types of icons according to the first embodiment of the invention, FIG. 7 is a drawing showing the configuration of a coding card according to the first embodiment of the invention, FIG. 8 is a flowchart of operating a figure body toy according to the first embodiment of the invention, FIG. 9 is a flowchart of operations that the figure body toy generates from icons according to the first embodiment of the invention, FIG. 10A is a drawing showing an operation control example of the figure body toy according to the first embodiment of the invention in which the figure body toy raises its right arm, FIG. 10B is a drawing showing an operation control example of the figure body toy according to the first embodiment of the invention in which the figure body toy turns its head to the right, FIG. 10C is a drawing showing an operation control example of the figure body toy according to the first embodiment of the invention in which the figure body toy raises its right leg, FIG. 10D is a drawing showing an operation control example of the figure body toy according to the first embodiment of the invention in which the figure body toy rides a running body, FIG. 11 is a drawing showing the configuration of a coding board according to a second embodiment of the invention, FIG. 12 is a drawing showing an internal configuration of the cording board according to the second embodiment of the invention, and FIG. 13 is a sequence drawing of a figure body toy and the coding board according to the second embodiment of the invention.

DETAILED DESCRIPTION OF THE PREFERRED EMBODIMENTS

First Embodiment

Hereinafter, referring to the drawings, an embodiment of the invention will be described. FIG. 1 is a drawing showing the configuration of a coding (programming) toy 10. The coding toy 10 includes a figure body 20 that is an object of control or a control object, a cording card (stage) 30 and icon blocks (parts) 40. The icon blocks 40 are disposed on the cording card 30. In this embodiment, the figure body 20 copies a human body, however, the figure body 20 may copies an animal body.

Additionally, the control object is not limited to the figure body 20 and hence may be a household electric appliance, a displayed image on a television set or a personal computer, another type of toy such as a running body or the like. The figure body 20 captures an image of a predetermined image capturing range 33 of the coding card 30 and reads one or a plurality of icon blocks 40 disposed on the coding card 30. The figure body 20 acts according to a type or types and a position or positions of the icon block 40 or icon blocks 40 that the figure body 20 has read.

FIG. 2 is a drawing showing the configuration of the figure body 20. The figure body 20 includes a control unit 21, a storage unit 22, an input unit 23, an output unit 24, and a communication unit 25. An icon table 220, which will be described later by reference to FIG. 4, is stored in the storage unit 22. The input unit 23 has an image capturing module 231 and a sound/voice collecting module 232. Additionally, the output unit 24 has a driven module 241, a sound/voice emitting module 242 and a display module 243.

The image capturing module 231 is a camera that includes an image capturing device such as a CCD sensor or a CMOS sensor and is provided in a position where an eye 202 of the figure body 20 is disposed as shown in FIG. 1. The image capturing module 231 has a function to obtain image data by capturing an image of a predetermined range of the coding card 30 and can detect light of a visible wavelength range, light of an invisible wavelength range such as an infrared ray or an ultraviolet ray, or light of a single color or lights of a plurality of colors. The sound/voice collecting module 232 is a sound/voice collecting microphone that is provided at an ear portion of a head 201 of the figure body 20 and can collect sound or voice.

The driven module 241 constitutes one or a plurality of modules that can be driven according to the shapes and functions of elements of the control object based on an instruction from the control unit 21. In the figure body 20 of this embodiment, the driven module 241 includes the head 201, the eye 202, a mouth 203, a neck 204, an arm 205, a hand 206, a torso 207 and a leg 208 that are shown in FIG. 1 as objects of drive.

The sound/voice emitting module 242 is a loudspeaker that is provided in a position where the mouth 203 of the figure body 20 is disposed. Sound or voice is emitted from the sound/voice emitting module 242, and a user can enter into a dialog with the figure body 20. Alternatively, the sound/voice emitting module 242 may emit music. The display module 243 can be provided in a position where the eye 201 is disposed as a light emitting module as shown in FIG. 1. For example, a display device such as an LED, a liquid crystal panel, and an organic EL panel can be used as the display module 243. The display module 243 may be provided in other positions as a display or an indicator for displaying or indicating a character, a picture or the like.

The communication unit 25 functions an input unit or an output unit that transmits and receives an infrared ray or a radio wave of a specific frequency for communication with external equipment or an external network. The figure body 20 may include a clock module in an interior thereof. The figure body 20 obtains a current time using this clock module to cause the sound/voice emitting module 242 or the display module 243 to output sound/voice or light accordingly. Further, the figure body 20 can include a switch (ON/OFF) for enabling the figure body 20 to operate alone or a switch for setting a volume of sound/voice to be emitted. The configuration of the figure body 20 shown in FIG. 2 is only one example, and hence, part of the configuration may be omitted or other configurations may be added thereto depending on an embodiment.

FIG. 3 shows the configuration of the icon block 40. FIG. 3A is a perspective view of the icon block 40. FIG. 3B is a development of the icon block 40. The icon block 40 of this embodiment is formed into a hexahedron or a cube measuring about 2 cm along each side, and different icons 41 (41a to 41f) are drawn on sides thereof as code identifiers. For example, in the development of the icon block 40 shown in FIG. 3B, an icon 41a on a first side is an emoji that represents a control content or detail of the figure body 20 that instructs the figure body 20 to "raise the arm 205 upwards." An icon 41*b* on a second side is an emoji representing a control detail instructing the figure body 20 to "bend the arm 205 upwards." An icon 41*c* on a third side is an emoji representing a control detail instructing the figure body 20 to "lower the arm 205 downwards." An icon 41*d* on a fourth side is an emoji representing a control detail instructing the figure body 20 to "repeat an action of raising the arm 205 upwards and an action of unbending the arm 205." An icon 41*e* on a fifth side is an emoji representing a control detail instructing the figure body 20 to "unbend the arm 205." An icon 41*f* on a sixth side is an emoji representing a control detail instructing the figure body 20 to "bend the arm 205 downwards." Correlations between the icons 41 and the control details can be defined in advance in an icon table 220, which will be described by reference to FIG. 4.

The icons 41 can be defined as required in association with the functions and shapes of elements of the control object. As other examples, since the control object of this embodiment is the figure body 20 having the form of a human body, for example, an "action of opening and closing an eye lid" and an "action of turning on or turning on and off the display module 243 such as an LED provided in the eye 202" can be defined in advance by corresponding icons 41 as actions of the eye 202.

Additionally, a "generation of sound or voice by the sound/voice emitting module 242" and an "action of opening and closing the mouth 203 in association with the generation of sound or voice" can be defined in advance by corresponding icons 41 as actions of the mouth 203. An "action of bending, unbending or twisting the neck 204" can be defined in advance by a corresponding icon 41 as an action of the neck 204. An "action of opening, closing or striking the hand 206" and an "opening and closing action of opening and closing the hand 206" can be defined in advance by corresponding icons 41 as actions of the hand 206. An "action of bending in the back" and an "action of swinging the hips" can be defined in advance by corresponding icons as actions of the torso 207. Then, an "action of bending or unbending the leg 208 or an "action of walking" can be defined in advance by a corresponding icon 41 as an action of the leg 208.

Additionally, the icon blocks 40 can be painted in different colors to match subjects or themes. The figure body 20 is designed to distinguish icons 41 of different colors, and many varieties of icons can be prepared. In this way, a plurality of varieties of icon blocks 40 are used depending on the colors (themes) of the icons 41, the number of sides (six sides) of the icon block 40 and the number of functions of the figure body 20. Icons 41 representing illustrations matching with themes or illustrations, words, and symbols can be printed on the sides of the icon block 40.

FIG. 4 is a drawing showing the configuration of the icon table 220. The icon table 220 stores icons 221 and control details 222 in a correlational fashion. The icons 221 include action icons 223 relating to the drive of the output unit 24 such as "raising the arm (right) obliquely upwards and "repeating "raising and unbending the arm (right)", time icons 224 relating to times, a control icon 225 relating to a flow control of a program and the like.

FIGS. 5 and 6 are drawings showing examples of icon classes. Icons 41 that are defined individually so as to match with items prescribed in icon classes 226, 228 or items prescribed in classifications 227, 229 of the icon classes 226, 228 are drawn on icon blocks 40. It should be noted that items prescribed in the icon classes 226, 228 and the classifications 227, 229 shown in FIGS. 5 and 6 are only examples and that items can be determined as required according to types of control objects. Hereinafter, the individual items will be described.

Icons of "head," "neck," "eye," "arm (right)," "arm (left)," "elbow (right)," "elbow (left)," "leg (right)," and "leg (left)" prescribed in the icon class 26 in FIG. 5 can be used to instruct actions of the relevant constituent elements of the figure body 20. Specific contents or details of the actions are prescribed further in the classification 227. For example, as actions that the "neck" in the icon class 226 takes, the classification 227 prescribes an action of "twisting to the right" and an action of "twisting to the left."

An "emoticon" in the icon class 226 can include icons 41 relating to greetings such as "Good morning," "Good night" and "How are you?" and emotions that are prescribed in the classification 227 and can be used to designate actions and dialogs representing the emotions of the figure body 20.

"Other emojis" in the icon class 226 can include icons 41 relating to "weather," "animal," "item," "sports" and the like that are prescribed in the classification 227 and can be used to designate themes of actions and dialogs of the figure body 20. For example, an icon 41 relating to the "item." in the classification 227 can indicate a camera, a bag, money, a mobile phone, a television set, music and the like. An icon 41 relating to the "sports" in the classification 227 can indicate soccer, Olympic Games and the like. An icon 41 relating to "school" in the classification 227 can indicate learning, a private school, teacher and the like. An icon 41 relating to "outing" in the classification 227 can indicate sea, a recreation ground, hospital and the like. An icon 41 relating to "plant" in the classification 227 can indicate tree, flower and the like. An icon relating to "family" in the classification 227 can indicate father, mother and the like. An icon relating to "life" in the classification 227 can indicate cleaning the teeth, taking a bath, changing clothes, having a meal, using a washroom and the like. An icon 41 relating to "play" in the classification 227 can indicate janken, the game of "scissors-paper-stone," a die or dice and the like. An icon relating to others in the classification 27 can indicate the moon, secret, diet food, thief, ghost, quarrel and the like.

"Dialog" in the icon class 226 can be used to designate a plurality of themes and speeches that are defined in advance for the figure body 20 to enter into a dialog with a user. The figure body 20 can recognize words expressed by the user and enter into a two-way dialog with the user. "Running body" in the icon class 266 can determine the control of a running body that is a separate control object interlocked with the figure body 20. For example, the figure body 20 can ride a running body 50 shown in FIG. 10D. The running body 50 can receive an instruction from the figure body 20 to advance, reverse or the like. A controlling example of the running body 50 will be described later by reference to FIG. 10D.

"Memory" in the icon class 228 in FIG. 6 can be used to store data for coding. For example, a "memory" icon of one icon block 40 can be formed in a specific pattern or color so as to be distinguished from a "memory" icon of another icon block 40. The figure body 20 that recognizes the "memory" icon stores the contents of icons that the figure body 20 has read by then and the contents of an icon 41 that the figure body 20 reads at the same time in the storage unit 22. As this occurs, icon information identifying the icon 41 and positional information indicating the position of the icon 41 are stored in the storage unit 22 in a correlational fashion as the contents of the icon 41. The figure body 20 causes the icon information and the positional information that are read from the communication unit 25 into a predetermined server via a network to be stored. Then, when a separate figure body 20 reads the "memory" icon concerned, the separate figure body 20 identifies the data stored in the server based on the specific pattern or color of the "memory" icon and can obtain the icon information and the positional information from a communication unit 25 thereof. The positional information can be defined as the position of the icon block 40 on the coding card 30 or a relative position of the icon block 40 to another icon block 40 on the coding card 30.

As another example, a memory icon block 40 may be used separately which is configured to read the icon information and the positional information stored in the storage unit 22 of the figure body 20 for storage in a wired or wireless fashion. A separate figure body 20 can read the icon information and the positional information from the memory icon block 40 in a wired or wireless fashion. In this way, the coding data can be shared with a friend or a parent using the icon block 40 having the "memory" icon 41, whereby the data can not only be exchanged but also be used as a new programming code by making a modification or addition to the data.

"Time" in the icon class 228 can be combined with other icons 41 that make the figure body 20 for use in designating a time or a period of time in relation to the action of the figure body 20. Values of "0 second," "5 seconds," "10 seconds" and the like that are prescribed in the classification 229 can be used for a length of the time or the period of time.

Additionally, a "time" icon can also be used as a control counter for counting an operation latency time. "Start/end" in the icon class 288 can be used to designate a start or an end of a code. For example, when disposing a "start/end" icon at the front and rear of a plurality of coded icons 41, a group of codes made up of the combined icons 41 can be recognized as one command or a series of programs. Alternatively, a label that can be referred to from other programs can be affixed to a series of programs defined at the front and rear by the "start/end" icons.

"Number of times" in the icon class 228 can be combined with the other icon 41 that make the figure body 20 perform the corresponding action for use in designating the number of times of performing the action. Additionally, an icon of "number of times" can also be used as a counter for counting the number of times of executing an operation of a certain volume. "BGM" in the icon class 228 can be used to designate a plurality of pieces of music (BGM). Similar to "BGM," "SE" in the icon class 228 can be used to designate a plurality of kinds of sound such as sound effect and voice (SE). The icons of "BGM" and "SE" may be used to designate a series of sound/voice emission controls using a plurality of pieces of music or sound effects.

"Stop/go" in the icon class 228 can be used to designate a stop and a start of an operation. "Wait" in the icon class 228 can be used to designate an action to stop an operation until a predetermined condition for the operation is satisfied. "Return to original" in the icon class 228 can be used to designate an operation of returning the figure body 20 to its original position or an original posture. "Angle" in the icon process 228 can be combined with the other icon 41 that make the figure body 20 perform the predetermined action for use in designating the action of the figure body 20. For example, when an "angle" icon indicating an angle of 45 degrees is combined with the "arm (right)" icon instructing the figure body 20 to "raise the arm obliquely upwards," an action of the figure body 20 can be designated in which the figure body 20 "raises the arm (right) 205 obliquely upwards at 45 degrees."

"Figure," "Hiragana," "Alphabet" and "Sign" in the icon class 228 can each be used to designate characters of letters. For example, the figure body 20 reads characters or letters shown on the "Figure," "Hiragana," "Alphabet" and "Sign" icons, whereby the name of the user or the figure body 20 can be registered.

"if" in the classification 229 of "others" in the icon class 228 can be used to designate a multipoint operation. The "if" can be combined with the other icons 41 as required to determine a branch condition and can determine on an operation that is to be operated when the branch condition is met or is not met. For example, when the "Good morning" icon of the emoticon and the "dialog" icon are used together with the "if," the figure body 20 emits the greeting words from the sound/voice emitting module 242, and when the figure body 20 judges that the user responds to its greeting, the figure body 20 can enter into a dialog corresponding to the "dialog" icon with the user.

FIG. 7 is a drawing showing the configuration of the coding card 30. FIG. 7 is a plan view of the cording card 30. The coding card 30 has a plate shape and includes a plurality of guides 31 where the icon blocks 40 are disposed and a theme display portion 32 where a coding theme of the coding card 30 is displayed on a surface thereof. In this embodiment, the guides 31 are disposed into a matrix configuration made up of rows and columns, and eight guides in total are provided in two rows and four columns. The user disposes the icon blocks 40 so as to match with the guides 31. The icon blocks 40 are disposed so that surfaces on which the icons 41 that are intended to be read by the figure body 20 are shown are directed upwards (towards a viewer of the drawing). The figure body 20 causes the image capturing module 231 to capture an image of an area including these guides 31 as an image capturing range 33 and obtains image data corresponding to the direction in which the icon blocks 40 are rested in the guides 31.

A coding theme can be displayed in the form of a text or an illustration in the theme display portion 32. The figure body 20 may obtain the coding theme described in the theme display portion 32 by including the theme display portion 32 in the image capturing range 33. As this occurs, the control unit 21 may analyze a designated control detail according to a combination of the obtained coding theme and the icons 41 disposed in the guides 31. Further, the coding card 30 can include a plurality of inclination correcting markers that are provided within the image capturing range 33. Even though the figure body 20 captures an image of the coding card 30 from an oblique direction, by capturing images of the icons and the markers, the control unit 21 can execute an image processing of correcting the inclination of the image from the positions of the markers and grasp the positions of the guides 31 appropriately, thereby making it possible to recognize the icons 41.

In FIG. 7, the icons 41 representing instructions to "raise the arm (right) upwards," "continue the same action for 15 seconds" and "return to original" are disposed sequentially in that order in the three guides 31 in the upper row from left to right on the coding card 30.

In this way, the icon blocks 40 can easily be disposed at predetermined intervals and in predetermined positions by using the coding card 30 having the guides 31.

FIG. 8 is a processing flowchart of the figure body 20. FIG. 9 is a processing flowchart that the figure body 20 generates from the icons 41 obtained. Additionally, FIG. 10 shows a control example of the figure body 20.

In FIG. 8, when a processing is started, the control unit 21 captures an image of the predetermined image capturing range 33 of the cording card 30 using the image capturing module 231 to fetch the captured image in step S100. The control unit 21 executes an image analysis on the fetched image to determine which icon or icons 41 are contained in the fetched image in step S110. Specifically, for example, the control unit 21 recognizes locations where the guides 31 are positioned in the image fetched in step S100. The control unit 21 then determines from the image on the image of the icon 221 with which the image of the position of the guide 31 coincides by referring to the icon table 220. In the example shown in FIG. 7 where the image of the coding card 30 is captured, the control unit 21 recognizes that in the plurality of guides 31, the three icons 41b, 41g, 41h are sequentially disposed in that order in the three guides 31 arranged in the upper row from left to right.

In step S120, the control unit 21 executes a syntax analysis based on icon information (code identifier information) that is identifying data of the icons 41 obtained in the analysis in step S110 and positional information on the positions of the icons 41. This positional information can be information that is defined by the positions of the guides 31 that are determined by the rows and the columns on the coding card 30. The syntax analysis is executed based on a predetermined syntax rule. For example, an order in which codes represented by the icons 41 are read is determined according to the positions of the guides 31. In each row, codes are read from a left column towards a right column, and in each column, codes are read from an upper row to a lower row. Since the first icon 41b represents the instruction to "raise the arm (right) upwards," the second icon 41g represents the instruction to "continue the same action for 15 seconds" and the third icon 41h represents the instruction to "return to original," the control unit 21 generates a program S140 for a processing flow shown in steps S141 to S145 in FIG. 9 and stores the generated program in the storage unit 22.

The order of reading the guides 31 is not determined for each guide in the column and may be determined so that rows that are each referred to as one group are read from an upper row to a lower row. As this occurs, in this embodiment, since the icons 41 of the separate attributes, that is, the action icon 223 representing the instruction to "raise the arm (right) upwards," the time icon 224 representing the instruction to "continue the same action for 15 seconds" and the control icon 225 that is the icon 41 of a separate attribute representing the instruction to "return to original" are combined together in the first row, the control unit 21 determines that a control content or detail determined by the combination of the icons 41 is for a processing of a series of actions and can generate the program S140 for the processing flow shown in steps S141 to S145 in FIG. 9.

In step S130, the control unit 21 gives the output unit 24 a control detail based on the program. S140 generated through the syntax analysis executed in step S120. In step S141, the control unit 21 raises the right arm 205a, which is the driven module, obliquely upwards. How the driven module is driven in step S141 is shown in FIG. 10A. In step S143, the control unit 21 keeps the right arm 205a in the raised state for 15 seconds. In step S145, the control unit 21 lowers the right arm 205a and ends the processing. Then, returning to FIG. 8, when the processing in step S130 ends, the processing of the figure body 20 ends.

The control unit 21 may control the sound/voice emitting module 242, the display module 243 or the communication unit 25 in addition to the driven module 241 based on the program S140 generated in step S120. Additionally, in step S130, the control unit may encourage the user to execute an input action through the input unit 23 by using sound/voice or a display and execute an output processing based on a control detail inputted by the user. Additionally, the control unit 21 may store the data or the processing detail inputted through the input unit 23 in the storage unit 22.

Next, other action forms of the figure body 20 will be described. In FIG. 10B, the figure body 20 drives the neck 204 and performs an action of turning to the right. In FIG. 10C, the figure body 20 performs an action of raising the right leg 208a upwards. In this way, the figure body 20 can express emotions by moving the portions of the body. The user can enjoy looking at facial expressions of the figure body 20 by controlling the actions of the eyes 202, the mouth 203 and the like shown in FIG. 1.

FIG. 10D shows an example in which the figure body 20 rides the riding body 50 that is a separate control object. The control body 20 obtains icon information of the riding body 50. Following the processing flowchart shown in FIG. 8, the control unit 21 captures the images of the icons 41 to fetch them in step S100 and then executes the image analysis in step S110, whereafter the control unit 21 executes the syntax analysis in step S120. In step S130, the control unit 21 transmits the information on the program S140 that the control unit 21 generates as a result of execution of the analysis in step S120 to the running body 50 via the communication unit 25. The running body 50 is controlled based on the information on the generated program S140 that the running body 50 receives through an appropriate reception unit thereof. Alternatively, in step S130, the control unit 21 may give a control instruction directly to the running body 50 to control the running body 50. As examples of controlling the running body 50, for example, the running body 50 that travels on three wheels can perform actions of "advancing," "reversing," "turning to the right" and "turning to the left" as prescribed in the classification 227 of the "running body" in the icon class 226 shown in FIG. 5 by controlling a front wheel 51 and rear wheels 52.

As a communication means for enabling the figure body 20 and the running body 50 to communicate with each other, a configuration may be adopted in which terminals provided at contact portions of the figure body 20 and the running body 50 are brought into contact with each other when the figure body 20 is rested on the running body 50 for a wired communication. Alternatively, a configuration may be adopted in which a wireless communication is effected between the figure body 20 and the running body 50 by using an infrared ray or a radio wave of a predetermined frequency. The running body 50 itself may have an image capturing unit for capturing images of the icons 41 to obtain images of the icons 41.

Thus, as has been described heretofore, in this embodiment, coding is described as being executed by using the icon blocks 40 on which the icons 41 are formed, and the figure body 20, which is the control object, is described as obtaining the icon information and the positional information by capturing the images of the icons 41 and the arrangement of the icons 41. In addition, the device for obtaining the icon information and the positional information is provided on the figure body 20 side. Consequently, a power supply does not have to be provided on the icon blocks 40 and the coding card 30, whereby the icon blocks 40 and the coding card 30 can be configured easily and simply, thereby making it possible to configure the whole of the coding toy 10 inexpensively, and easily and simply.

Second Embodiment

Next, a second embodiment will be described. FIG. 11 is a drawing showing the configuration of a coding board 60.

In this embodiment, to dispose icon blocks 40, the coding board (state) 60 is used in place of the coding card 30 of the first embodiment. In addition, information on icons 41 of icon blocks 40 and information on the positions of the icons 41 are obtained by the coding board 60.

The coding board 60 has a plate shape and has a plurality of mounting portions 61. The mounting portions 61 are disposed in a matrix configuration made up of rows and columns, and in this embodiment, 32 mounting portions in total are provided in a matrix configuration of four rows and eight columns. Alphabets in upper case and lower case are given for rows and columns of mounting portions 61 in corresponding positions as row numbers 62 and column numbers 63. In coding, the user disposes a selected icon block 40 or icon blocks 40 in the mounting portions 61 while registering them with the positions of the corresponding mounting portions 61. In addition, the icon blocks 40 are disposed so that surfaces where icons 41 intended to be read by a figure body 20 are shown are directed upwards (towards a viewer of the drawing).

The mounting portions 61 may be formed by drawing frame lines that guide resting positions of the icon blocks 40 or formed of quadrangular depressions that are slightly greater than a side of the icon block 40. In the case where the mounting portions 61 are formed of the depressions, the icon blocks 40 are fitted in the depressions, whereby the icon blocks 40 are fixed in place in terms of position. By doing so, icons 41 drawn on the icon blocks 40 can easily be disposed at predetermined intervals and in predetermined positions.

FIG. 12 is a drawing showing an internal configuration of the coding board 60 of this embodiment. The coding board 60 of this embodiment includes the mounting portions 61, aboard control unit 64, a storage unit 65, a detection unit 66, and a communication unit 67. The detection unit 66 detects an existence of an icon block 40 in each of the mounting portions 61 shown in FIG. 11. When the detection unit 66 detects an existence of an icon block 40 in one of the mounting portions 61, the detection unit 66 then detects a displayed icon 41 of the icon block 40 in that position. The communication unit 67 functions as an input unit or an output unit for transmitting and receiving data between external equipment and itself in a wired or wireless fashion.

A detection method for detecting the icon block 40 according to the embodiment will be described. For example, the icon block 40 has a plurality of irregularities that constitute an identifier for an icon 41 drawn on each side of the icon block 40 on a side lying opposite to the side where the icon 41 concerned is drawn. Namely, when the icon block 40 is rested in the mounting portion 61 with an icon 41 that the user wants to display directed upwards, the irregularities corresponding to the icon 41 concerned are disposed on a resting side of the icon block 40. The board control unit 64 detects a pattern formed by the plurality of irregularities by a physical switch provided on the mounting portion 61 side. This detection of the irregularities pattern makes it possible to detect in which position the rested icon block 40 is disposed and which icon 41 of the icon block 40 is directed upwards so as to be displayed in that position.

Alternatively, a configuration may be adopted in which the icon block 40 has devices for indicating specific electrical values corresponding individually to the icons 41 on the sides thereof, and the board control unit 64 reads in which position the icon block 40 is disposed and which icon 41 of the icon block 40 is directed upwards so as to be displayed. For example, the icon block 40 incorporates passive components corresponding to the icons 41 on the sides of the icon block 40 with both terminals of each passive device exposed to the outside. Additionally, detection terminals of a specific value, not shown, are provided on the mounting portions 61. When the icon block 40 is rested in the mounting portion 61, the icon block 40 and the mounting portion 61 are connected electrically together at the terminals thereof, and the detection unit 66 measures specific values corresponding to the icons 41 to thereby be able to detect which icon 41 is disposed in which position. For example, when the passive component is a resistor, then, the board control unit 64 measures a resistance value as the specific value.

FIG. 13 shows sequence charts for a figure body 20 and the coding board 60 of this embodiment. When a processing is started, in step S200, the board control unit 64 detects whether or not the icon blocks 40 are disposed in the individual mounting portions 61 on the coding board 60 by using the detection unit 66. Then, the board control unit 64 detects the icons 41 of the detected icon blocks 40.

In step S210, the board control unit 64 transmits icon information 301 that is identification data of each detected icon 41 and positional information 302 on a position corresponding to each icon 41 towards the figure body 20 via the communication unit 67. The positional information 302 can be defined, for example, by the position of the mounting portion 61 that is determined by the row number 62 and the column number 63 on the coding board 60.

In step S220, a control unit 21 of the figure body 20 receives the icon information 301 and the positional information 302 via a communication unit 25. In step S230, the control unit 21 executes a syntax analysis based on the icon information 301 and the positional information 302 that the control unit 201 receives in step S220 to thereby generate a program. As a syntax analyzing method, the syntax analysis can be executed by following a similar rule to the syntax rule shown in step S120. In step S240, the control unit 21 gives an output unit 24 an instruction to execute a processing that follows the program generated in step S230 and controls a driven module 241, a sound/voice emitting module 242, a display module 243 and the like.

Thus, according to the embodiments that have been described heretofore, the figure body 20 can be controlled as a result of the figure body 20 reading the code assembled by disposing the icon blocks 40 by using the image capturing module 231 or the coding board 60 reading the same code by using the detection unit 66.

With the coding toy 10, the user can enjoy moving the figure body 20 or a dialog with the figure body 20 by using the program coded by the icon blocks 40. In the coding toy 10, since the various icon blocks 40 are used, a wide variety of coding patterns can be provided, whereby the user can not only develop his or her imaginative faculty but also bring up his or her subjecthood, communication capability and durability by performing programming work repeatedly.

Thus, while the embodiments of the invention have been described heretofore, the invention is not limited by the embodiments but can be carried out in various forms by modifying them variously. For example, in the embodiments, the cubical icon blocks 40 are used which have the icons 41 that are formed on the sides thereof. However, other polyhedral blocks may be used which have the icons 41 that are formed on sides thereof. Alternatively, an icon card may be used which has the icons 41 that are formed on both sides thereof.

In the embodiments, a one-dimensional code like a bar code, a two-dimensional code like a QR code (registered trademark), or a colored bar code in which information contained in one of signs of a two-dimensional code is multi-valued by coloring can be displayed as a code identifier on each side of the icon block 40. The one-dimensional codes, the two-dimensional codes, and the colored bar codes that change according to the direction in which the icon block 40 is rested can be read by the image capturing module 231 in the case of the figure body 20 of the first embodiment and by the detection unit 66 in the case of the coding board 60 of the second embodiment.

In the embodiments, the figure body 20 may obtain the code identifiers shown by the icon block 40 through radio frequency identification (RFID). For example, the icon block 40 includes an RF tag whose value to be read changes according to the direction in which the icon block 40 is rested. Code identification information specific to this RF tag can be obtained by the input unit 23 in the case of the figure body 20 of the first embodiment and by the detection unit 66 in the case of the coding board 60 of the second embodiment. Additionally, the icon block 40 including the RF tag can be used as a memory block by designing the RF tag to read and write coding data.

The figure body 20 and the coding board 60 may obtain an object identifier (OID) that is contained in the code identifier of the icon block 40 as code identifier information for use in the processing like the syntax analysis, the output control or the like.

Additionally, the first embodiment and the second embodiment can be combined together. Namely, when obtaining the icon information and the positional information, the figure body 20 obtains the icon information and the positional information by capturing the image of the icon 41 by the image capturing module 231. Additionally, the figure body 20 may obtain the icon information and the positional information by the coding board (stage) 60 detecting the icon 41 and transmitting the results of the detection to the figure body 20. Which of the methods should be used to obtain the icon information and the positional information can be determined as required as a result of a user's selection or according to the specifications of the coding card 30 and the coding board 60.

In the embodiments, the positional information is defined as the position that is determined by the row and the column on the coding card 30 or the coding board 60. However, the positional information may be defined by a relative position of the icons 41.

In the first embodiment, the figure body 20 obtains the icon information and the positional information by capturing the image of the image capturing range 33 that includes all the guides 31 of the coding card 30 by using the image capturing module 231. However, the figure body 20 may capture individually images of the icon blocks 40 disposed in the guides 31 within a part of the image capturing range 33 to obtain the icon information and the positional information.

What is claimed is:

1. A coding toy comprising:
  a control object having a control unit, an input unit, and an output unit; and
  a part having a code identifier corresponding to a control detail of the control object,
  wherein the control unit obtains, through the input unit, code identifier information and positional information from the code identifier indicated by the part, wherein the code identifier is disposed in a predetermined position on the part and the positional information is based on a position of the part, wherein the code identifier causes the output unit to control the control object using the control detail and in a control sequence that are determined by the code identifier information and the positional information,
  wherein the code identifier is an icon drawn on the part, and
  wherein the control unit obtains the code identifier information and the positional information by capturing an image of the part using the input unit.

2. The coding toy according to claim 1,
  wherein the part is a hexahedral block having different code identifiers like the code identifier on each of sides thereof, and
  wherein the code identifier indicated by the hexahedral block is determined by a direction in which the hexahedral block is rested.

3. The coding toy according to claim 1,
  wherein the control object is a figure body, and
  wherein the output unit comprises one or more of a driven module, a sound/voice emitting module and a display module.

4. The coding toy according to claim 2,
  wherein the control object is a figure body, and
  wherein the output unit comprises one or more of a driven module, a sound/voice emitting module and a display module.

5. The coding toy according to claim 1,
  wherein the control unit executes a syntax analysis based on the code identifier information and the positional information that the control unit obtains by following a predetermined syntax rule to thereby generate a program for controlling the output unit.

6. The coding toy according to claim 2,
  wherein the control unit executes a syntax analysis based on the code identifier information and the positional information that the control unit obtains by following a predetermined syntax rule to thereby generate a program for controlling the output unit.

7. The coding toy according to claim 3,
  wherein the control unit executes a syntax analysis based on the code identifier information and the positional information that the control unit obtains by following a predetermined syntax rule to thereby generate a program for controlling the output unit.

8. The coding toy according to claim 1, comprising:
  a stage on which the part is disposed in the predetermined position.

9. The coding toy according to claim 2, comprising:
  a stage on which the part is disposed in the predetermined position.

10. A block having a code identifier corresponding to a control detail of a control object and configured to provide the control object with code identifier information and positional information based on a predetermined position of the code identifier on the block and a position of the block, wherein the code identifier causes the control object to be controlled using the control detail and in a control sequence that are determined by the code identifier information and the positional information,
  wherein the code identifier is an icon drawn on the control object, and
  wherein a control unit obtains the code identifier information and the positional information by capturing an image of the control object using an input unit.

11. A figure body toy having a control unit, an input unit and an output unit,
  wherein the control unit obtains, through the input unit, code identifier information and positional information from a code identifier corresponding to a control detail of the figure body indicated by a part, wherein the code identifier is disposed in a predetermined position on the part and the positional information is based on a position of the part, wherein the code identifier causes the output unit to control the figure body using the control detail and in a control sequence that are determined by the code identifier information and the positional information, wherein the code identifier is an icon drawn on the part, and wherein the control unit obtains the code identifier information and the positional information by capturing an image of the part using the input unit.

12. A stage configured to allow a part having a code identifier corresponding to a control detail of a control object to be disposed in a predetermined position thereon, wherein the code identifier is configured to provide the control object with code identifier information and positional information based on the predetermined position and a position of the part on the stage, wherein the code identifier is configured to cause the control object to be controlled using the control detail and in a control sequence that are determined by the code identifier information and the positional information, wherein the code identifier is an icon drawn on the part, and wherein a control unit obtains the code identifier information and the positional information by capturing an image of the part using an input unit.

13. A coding method for a coding toy that comprises a control object and a part having a code identifier corresponding to a control detail of the control object, wherein the code identifier is an icon drawn on the part, comprising:

causing the control object to obtain code identifier information and positional information from the code identifier, wherein the code identifier is disposed in a predetermined position on the part and the positional information is determined from a position of the part;

controlling the control object using the control detail and in a control sequence that are determined by the code identifier information and the positional information, and causing the control object to obtain the code identifier information and the positional information by capturing an image of the part using an input unit.

* * * * *